United States Patent [19]

Linhoff

[11] Patent Number: 5,411,326
[45] Date of Patent: May 2, 1995

[54] BRAKE SYSTEM FOR CONTROLLING WHEEL BRAKE PRESSURE DURING BRAKE SLIP CONTROL AND TRACTION SLIP CONTROL

[75] Inventor: Paul Linhoff, Kelkheim-Eppenhain, Germany

[73] Assignee: ITT Automotive Europe GmbH, Germany

[21] Appl. No.: 232,130

[22] PCT Filed: Sep. 19, 1992

[86] PCT No.: PCT/EP92/02166

§ 371 Date: Apr. 26, 1994

§ 102(e) Date: Apr. 26, 1994

[87] PCT Pub. No.: WO93/09010

PCT Pub. Date: May 13, 1993

[30] Foreign Application Priority Data

Nov. 2, 1991 [DE] Germany .................. 41 36 109.1

[51] Int. Cl.⁶ .................. B60T 8/34; B60T 8/48; B60T 8/42; B60K 28/16
[52] U.S. Cl. .................. 303/116.2; 303/113.2
[58] Field of Search ............ 303/116.1, 116.2, 116.4, 303/115.4, 113.2, 113.1, DIG. 1-4, 10, 11

[56] References Cited

U.S. PATENT DOCUMENTS

| 5,152,586 | 10/1992 | Burgdorf | 303/113.2 |
| 5,174,636 | 12/1992 | Burgdorf et al. | 303/116.1 |
| 5,288,142 | 2/1994 | Burgdorf | 303/116.2 |

FOREIGN PATENT DOCUMENTS

| 0418602A2 | 3/1991 | European Pat. Off. . | |
| 3727664 | 3/1989 | Germany . | |
| 3832023 | 3/1990 | Germany . | |
| 3926244 | 2/1991 | Germany . | |
| 3931307 | 3/1991 | Germany . | |
| 4009379 | 9/1991 | Germany . | |
| 4032784 | 9/1991 | Germany . | |
| 4039088 | 6/1992 | Germany . | |
| 4107626 | 9/1992 | Germany | 303/116.2 |
| 281754 | 3/1990 | Japan | 303/113.2 |
| 2214250 | 8/1989 | United Kingdom | 303/116.2 |
| 2230578 | 10/1990 | United Kingdom . | |
| 2252600 | 8/1992 | United Kingdom | 303/113.2 |

*Primary Examiner*—Matthew C. Graham
*Attorney, Agent, or Firm*—Ratner & Prestia

[57] ABSTRACT

A brake system operates on the back-flow principle during brake slip control and is furnished with a self-priming pump (9) to achieve, during traction slip control, a rapid response of the wheel brakes without requiring the use of a high-pressure accumulator. This is achieved by a low-pressure accumulator (6) of a special design which includes an intake channel (7) to the intake side of the pump (9) for brake slip control and a separate intake channel (8) to the intake side of the pump (9) for traction-slip control. During brake slip control, only a partial discharge of the low-pressure accumulator (6) up to a defined remaining standby volume, through the brake slip control intake channel (7), is enabled because a valve (24, 25) controlled by the piston stroke will then close. Upon commencement of a traction slip control action, a valve in the traction slip control intake channel (8) is opened electromagnetically. Thus, the standby volume, at a slight static pressure, is made available to the intake side of the pump (9), thereby eliminating extended intake distances.

8 Claims, 1 Drawing Sheet

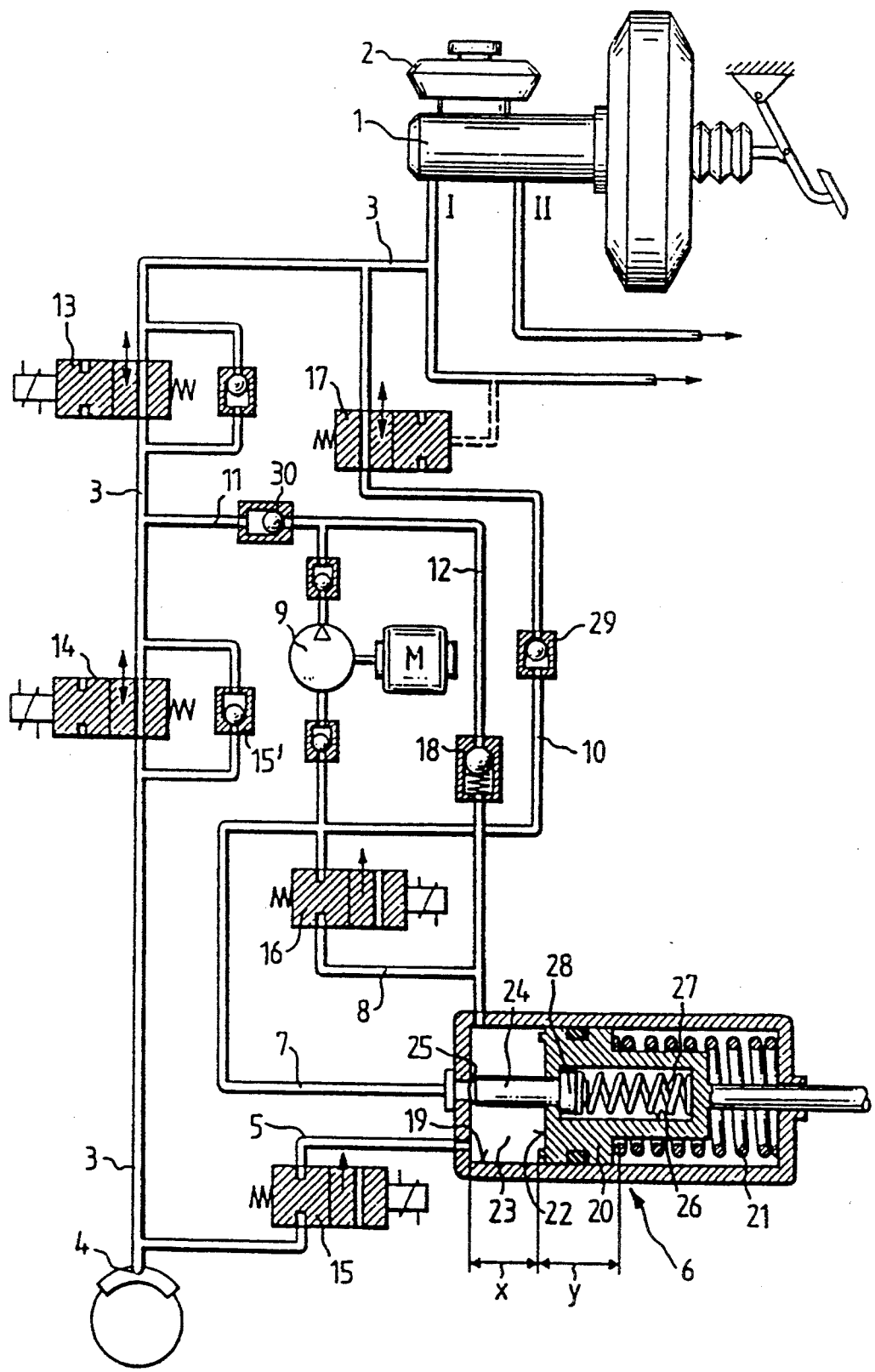

BRAKE SYSTEM FOR CONTROLLING WHEEL BRAKE PRESSURE DURING BRAKE SLIP CONTROL AND TRACTION SLIP CONTROL

BACKGROUND OF THE INVENTION

The present invention is concerned with a slip-controlled hydraulic brake system for controlling fluid pressure in a wheel cylinder of a driven wheel of an automotive vehicle, during normal braking, brake slip control and traction slip control.

A brake system of this type is described by German Patent DE-38 32 023 A1. During brake slip control, this system operates on the back-flow principle, which involves pressure fluid flow from the outlet of a pump to a brake conduit in fluid communication with an inlet valve of a wheel brake and from an outlet valve of the wheel brake to the inlet of the pump. The pump of this system is a self-priming pump, which is also used for traction slip control. The pump takes in pressure fluid, through the master cylinder, from the pressure fluid reservoir, and feeds the pressure fluid into the wheel cylinder. The direct feed to the wheel cylinder results in the benefit that no additional high-pressure accumulator is required.

However, in systems of that type, especially at low temperatures due to the high viscosity of the pressure fluid, the response time of traction slip control is longer than the response time for systems having a high-pressure accumulator. A reason for the increased response time is because long-length conduits and a plurality of valves are provided between the pump and the pressure fluid reservoir, thereby constricting the volume flow and resulting in take-in losses.

SUMMARY OF THE INVENTION

The problem underlying the present invention resides in providing, in a brake system of the aforedescribed type, during traction slip control, a rapid loading of the wheel cylinder, avoiding the need for a high-pressure accumulator.

This problem is solved by providing a low-pressure accumulator on the intake side of a pump and regulating pressure fluid flow between the low-pressure accumulator and the intake side of the pump. A brake slip control intake channel and a traction slip control intake channel permit pressure fluid flow between the intake side of the pump and the low-pressure accumulator. The brake slip control intake channel is closed as long as the pressure fluid volume stored within the low-pressure accumulator is less than a predetermined standby volume. The traction slip control intake channel is independently opened and closed by a traction slip control loading valve, regardless of the pressure fluid volume stored within the low-pressure accumulator.

Because a stand-by volume is made available by the low-pressure accumulator to the pump during traction-slip control, no intake losses occur toward the intake side of the pump in view of the short-length traction-slip control intake channel. In addition, the static pressure in the low-pressure accumulator has a positive effect on the initial rating of the pump.

According to an embodiment of the present invention, the low-pressure accumulator is disposed in a housing bore and includes an axially displaceable piston, which is sealed against the housing bore. The piston separates a pressure-fluid containing axial section of the housing bore, serving as a reservoir, from a pressure fluid-free axial section of the housing bore, which is open to atmospheric pressure. Disposed in the brake slip control intake channel is a valve, for example a travel-controlled valve, which is switched depending on the position of the piston. This embodiment obviates the need for a costly electronic system provided with sensors and conduits.

According to another aspect of the present invention, the axially displaceable piston of the low-pressure accumulator is loaded by a compression spring toward the reservoir. Within a central bore of the piston is a second compression spring, which applies pressure to a plunger axially protruding from the central bore of the piston into the reservoir. The end of the plunger serves as a valve body and cooperates with a valve seat formed on the housing of the low-pressure accumulator, for controlling pressure fluid flow through the brake slip control intake channel. The stroke of the plunger out of the piston is confined by a stop, which causes the piston to entrain the plunger after the piston has moved over a predetermined distance. This design is particularly simple and space-saving.

BRIEF DESCRIPTION OF THE DRAWING

To further clarify the inventive conception, an embodiment of the invention is described with reference to the drawing, which is a schematic view of a brake system of the present invention forming part of the wheel brake of a driven wheel.

DETAILED DESCRIPTION OF THE INVENTION

The brake system of the present invention shown in the drawing includes a master cylinder 1, which is responsive to movement of a brake pedal for developing a pressure increase of pressure fluid. Pressure fluid reservoir 2 is seated on master cylinder 1 and supplies pressure fluid to the master cylinder 1 and the brake circuits I and II. A conduit 3 extends from the master cylinder 1 to a wheel cylinder 4 of a driven wheel. The wheel cylinder 4, through a release conduit 5, is in communication with a low-pressure accumulator 6.

The brake slip control (also anti-lock control or ABS) intake channel 7 and the traction slip control, ASR, intake channel 8 lead from the low-pressure accumulator 6 to the intake side of a pump 9. Pump 9, through an intake, or feed, conduit 10 and the master cylinder 1, is in communication with the pressure fluid reservoir 2. The pressure side of the pump 9, through a pressure conduit 11, is in communication with the brake conduit 3 and, through a release conduit 12, having a release valve 18, is in communication with the low-pressure accumulator 6.

A magnetic valve 13, serving as a traction slip control separator valve, is disposed in the brake conduit 3 above the inlet of the pressure conduit 11, i.e. between the master brake cylinder 1 and the inlet of the pressure conduit 11. A second magnetic valve 14, serving as a wheel cylinder inlet valve, is disposed in the brake conduit below the inlet of the pressure conduit 11, i.e. between the wheel cylinder 4 and the inlet of the pressure conduit 11. Both magnetic valves 13 and 14 are open in their de-energized condition. A check valve 15' is connected in parallel to the magnetic valve 14 and opens toward the master cylinder 1. The upper magnetic valve 13 serves as a traction slip control separator valve with a parallel-connected check valve also permitting pressure fluid flow into the brake circuits (i.e. away from the master cylinder 1) during traction slip control once the traction slip control separator is closed.

Disposed in the return conduit 5 is an electromagnetic outlet valve 15 which is closed in its de-energized condition. The traction slip control intake channel 8 is furnished with a traction slip control loading valve 16. Disposed in the feed conduit 10 is a hydraulically actuated feed valve 17, which is open in its non-pressurized condition and which, in any pedal braking operation such as normal braking or brake slip control, is closed by the pressure increase of the master cylinder 1. The check valve 29 in the feed conduit 10 only permits a pressure fluid flow from the master cylinder 1 to the intake side of the pump 9, whereas the check valve 30 in the pressure conduit prevents the low pressure accumulator 6 from being loaded by pedal braking, thereby absorbing volume.

One of the characterizing features of this brake system resides in the design of the low-pressure accumulator 6. Disposed in a cylindrical bore 19 of a housing, in a sealed and axially displaceable manner, is a piston 20, which is axially loaded by a compression spring 21. The part of bore 19 accommodating the compression spring 21 is in communication with the atmosphere and is free of any pressure fluid. The front side 22 of the piston 20 facing away from the compression spring 21 confines a reservoir 23 having a variable volume dependent on the position of piston 20. Plunger 24 is guided through a central hole provided in the front side 22 and, together with the valve seat 25, plunger 24 forms a valve controlled by the piston stroke. Located in the interior of the piston 20 is an axial bore 26, having a diameter exceeding the diameter of the plunger. A bore compression spring 27 is disposed in the bore 26 and applies pressure to the plunger 24 toward the reservoir 23. The stroke of the plunger 24 out of the piston 20 is confined by a peripheral stop bead 28.

The above-described design of the low-pressure accumulator 6 causes the plunger 24 to be closely mounted on the valve seat 25 as long as the piston stroke is less than the distance x. Only during passage through a distance y, marking the remainder of the piston stroke, the plunger 24 is entrained by piston 20, thereby permitting pressure fluid flow through the brake slip control intake channel 7 which is in abutment with the valve seat 25. Pressure fluid flow through the return conduit 5 and the traction slip control intake channel 8, each of which also lead to the reservoir 23, is independently controllable, regardless of the piston stroke.

The operation of the brake system is described as follows:

During normal, pedal-operated braking, i.e. when there is no tendency of wheel lock, all valves are in the position as shown except for the intake valve 17 which is closed by the pressure in the master cylinder 1. Brake conduit 3 conducts pressure fluid from the master cylinder 1 to the wheel cylinder 4 and the outlet valve 15 is closed to permit a pressure increase in the wheel cylinder 4.

During brake slip control, the brake slip exceeds a defined threshold value so that a tendency of wheel lock is sensed. The brake system, during brake slip control, works on the traditional back-flow principle, which involves pressure fluid flow from the outlet of pump 9 to brake conduit 3 in fluid communication with inlet valve 14 and from outlet valve 15 to the inlet of pump 9. The inlet valve 14 and the outlet valve 15 respectively regulate pressure fluid flow to and from the wheel cylinder 4. A standby volume, which corresponds to the volume when the piston is at a position x, is contained in the low-pressure accumulator 6. As shown, the piston position is at the end of the stroke x so that valve 24/25 is closed, which prevents pressure fluid flow from the low-pressure accumulator 6 to pump 9 through the brake slip control intake channel 7; when the piston is moved across the distance y, the plunger 24 is lifted by the piston 20 from the valve seat 25. The closed valve 24/25, during brake slip control, protects the wheel cylinder 4 against vacuum created by pump 9.

During traction slip control as wheel slippage is sensed, the intake valve 17 remains opened. At the beginning of a traction slip control phase, the traction slip control loading valve 16 is opened, and the standby volume is available to the intake side of the pump. In view of the static pressure in the low-pressure accumulator 6 and the short-length traction slip control intake channel 8, the traction slip control rapidly responds. Only if additional pressure fluid volume is needed in the course of traction slip control, the self-priming pump 9 is energized with pressure fluid from the pressure fluid reservoir 2, through the master cylinder 1 and the intake conduit 10, and pumps, in a known manner, through the pressure conduit 11 and the brake conduit 3 into the wheel cylinder 4. The pressure control of the wheel cylinder is regulated through switching the inlet valve 14 and the outlet valve 15 through which the pressure fluid is conducted to the low-pressure accumulator 6.

To safeguard the standby volume in the low-pressure accumulator 6, test runs of pump 9 are provided in which the inlet valve 14 is closed and the low-pressure accumulator 6 is loaded through the release valve 18 until valve 24/25 is opened. Test runs of this type can be carried out with each start of the engine or even more frequently. The static pressure of the release valve 18, in that arrangement, is higher than the maximum applied brake pressure.

I claim:

1. A slip-controlled hydraulic brake system comprising a master cylinder and a pressure fluid reservoir connected thereto, further comprising a brake conduit connecting the master cylinder to a wheel cylinder of a driven wheel, a low-pressure accumulator connected, through a return conduit, to the wheel cylinder, a self-priming pump which, with the intake side thereof, is connected to the low-pressure accumulator and, through an intake conduit and the master cylinder, is connected to the pressure fluid reservoir and which, with the pressure side thereof, is in communication with the brake conduit, further comprising an inlet and outlet valve arrangement controlling the pressure within the wheel cylinders, and comprising another valve arrangement which, in a pedal-actuated braking operation, separates the intake side of the pump from the master cylinder and, during traction slip control, discontinues the connection between the master cylinder and the wheel cylinder, characterized in that the communication between the intake side of the pump and the low-pressure accumulator comprises one ABS-intake channel and one ASR-intake channel each, with the ABS-intake channel being closed as long as the pressure fluid volume stored within the low-pressure accumulator is less than a predetermined standby volume, and with the ASR-intake channel being opened and closed by an ASR-loading valve independently of the stored pressure fluid volume.

2. A brake system according to claim 1, characterized in that the low-pressure accumulator, in a housing bore, comprises an axially displaceable piston sealed against the housing bore, which separates a pressure-fluid containing axial section of the housing bore serving as a low-pressure accumulator reservoir from a pressure fluid-free axial section of the housing bore, and that the ABS-intake channel is controlled by a travel controlled valve which is switched depending on the position of the piston.

3. A brake system according to claim 2, characterized in that the piston, from the pressure fluid-free axial section of the housing bore is loaded by a first compression spring toward the low-pressure accumulator reservoir, and that a plunger axially protrudes from the piston into the low-pressure accumulator reservoir, to which plunger is applied pressure, within the piston, by a second compression spring toward the low-pressure accumulator reservoir and which plunger acts, with a valve seat, as the travel-controlled controlling the ABS-intake channel, with the stroke of the plunger out of the piston being confined by a stop.

4. A brake system for controlling fluid pressure in a wheel cylinder of a driven wheel during normal braking, brake slip control and traction slip control, said brake system comprising:

a brake pedal;

a pressure fluid reservoir for supplying pressure fluid;

a master cylinder connected to said pressure fluid reservoir and responsive to movement of said brake pedal for developing a pressure build up of pressure fluid;

a low-pressure accumulator defining a low-pressure accumulator reservoir for storing a variable volume of pressure fluid;

a self-priming pump having an intake side and a pressure side;

first pressure fluid flow control means extending between said master cylinder and said wheel cylinder:

(a) for permitting pressure fluid flow between said master cylinder and said wheel cylinder during normal braking as said brake pedal is actuated and without sensing a tendency of wheel lock, (b) for regulating pressure fluid flow to said wheel cylinder during brake slip control as a tendency of wheel lock is sensed, and (c) for preventing pressure fluid flow to said master cylinder during traction slip control as wheel slippage is sensed;

second pressure fluid flow control means extending between the pressure side of said pump and said first control means for permitting pressure fluid flow between the pressure side of said pump and said first control means during brake slip control and traction slip control;

third pressure fluid flow control means extending between said wheel cylinder and said low-pressure accumulator:

(a) for preventing pressure fluid flow between said wheel cylinder and said low-pressure accumulator during normal braking, and (b) for regulating pressure fluid flow between said wheel cylinder and said low-pressure accumulator during brake slip control and traction slip control; and fourth pressure fluid flow control means extending between the intake side of said pump and said pressure fluid reservoir, and the intake side of said pump and said low-pressure accumulator:

(a) for preventing pressure fluid flow between said pressure fluid reservoir and the intake side of said pump during normal braking and brake slip control, (b) for preventing pressure fluid flow between said low-pressure accumulator and the intake side of said pump during brake slip control when the volume of pressure fluid in said low-pressure accumulator reservoir is less than a standby volume, (c) for permitting pressure fluid flow between said low-pressure accumulator and the intake side of said pump during brake slip control when the volume of pressure fluid in said low-pressure accumulator reservoir is greater than the standby volume, (d) for permitting pressure fluid flow between said low-pressure accumulator and the intake side of said pump during traction slip control independent of the volume of pressure fluid in said low-pressure accumulator reservoir, and (e) for permitting pressure fluid flow between said pressure fluid reservoir and the intake side of said pump during traction slip control if additional pressure fluid is needed.

5. A brake system in accordance with claim 4 wherein:

said low-pressure accumulator comprises a housing having a bore and an axially displaceable piston sealed against said bore, wherein said piston separates a first axial section of said bore defining said low-pressure accumulator reservoir from a second axial section of said bore open to atmospheric pressure; and said fourth pressure fluid flow control means include:

(a) a brake slip control intake channel extending between the intake side of said pump and said low-pressure accumulator, (b) a traction slip control intake channel extending between the intake side of said pump and said low-pressure accumulator, and (c) a traction slip control loading valve disposed within said traction slip control intake channel for permitting pressure fluid flow from said low-pressure accumulator to said pump during traction slip control independent of the volume of pressure fluid in said low-pressure accumulator reservoir.

6. A brake system in accordance with claim 5 wherein:

said low-pressure accumulator further comprises:

(a) a first compression spring disposed within said housing for biasing said piston toward said low-pressure accumulator reservoir, and (b) a plunger axially protruding from said piston into said low-pressure accumulator reservoir;

said piston includes a central bore and a second compression spring disposed within said central bore for biasing said plunger toward said low-pressure accumulator reservoir;

said piston housing forms a valve seat opening into said brake slip control intake channel for engaging with said plunger to control pressure fluid flow through said brake slip control intake channel; and said plunger includes a stop for limiting the stroke of said plunger out of said piston.

7. A brake system for controlling fluid pressure in a wheel cylinder of a driven wheel during normal braking, brake slip control and traction slip control, said brake system comprising:

a brake pedal;

a pressure fluid reservoir for supplying pressure fluid;

a master cylinder connected to said pressure fluid reservoir responsive to movement of said brake pedal for developing a pressure build up of pressure fluid in said master cylinder in response to actuation of said brake pedal;

a brake conduit extending between said master cylinder and the wheel cylinder of the driven wheel for conducting pressure fluid between said master cylinder and the wheel cylinder of the driven wheel;

a return conduit connected to said wheel cylinder for conducting pressure fluid from said wheel cylinder;

a low-pressure accumulator defining a low-pressure accumulator reservoir for storing a variable volume of pressure fluid and connected, through said return conduit, to said wheel cylinder;

a self-priming pump having an intake side and having a pressure side in communication with said brake conduit;

an intake conduit, extending between the intake side of said pump and said pressure fluid reservoir through said master cylinder, for conducting pressure fluid to said pump;

an inlet valve disposed in said brake conduit for regulating pressure fluid flow to said wheel cylinder;

an outlet valve disposed in said return conduit for regulating pressure fluid flow from said wheel cylinder;

valve means for:

(a) preventing pressure fluid flow between the intake side of said pump and said master cylinder during normal braking and brake slip control, and (b) preventing pressure fluid flow between the master cylinder and the wheel cylinder during traction slip control;

a brake slip control intake channel extending between the intake side of said pump and said low-pressure accumulator reservoir, for preventing pressure fluid flow from said low-pressure accumulator reservoir to said pump during brake slip control when the stored volume of pressure fluid within said low-pressure accumulator reservoir is less than a standby volume;

a traction slip control intake channel extending between the intake side of said pump and said low-pressure accumulator reservoir; and a traction slip control loading valve disposed in said traction slip control intake channel for permitting pressure fluid flow from said low-pressure accumulator reservoir to said pump during traction slip control independent of the volume of pressure fluid in said low-pressure accumulator reservoir.

8. A slip-controlled hydraulic brake system comprising:

a master cylinder;

a low-pressure accumulator having a stored pressure fluid volume;

a wheel cylinder of a driven wheel;

a return conduit for connecting said low-pressure accumulator to said wheel cylinder;

a pressure fluid reservoir, connected to said master cylinder, for supplying pressure fluid;

a brake conduit connecting said master cylinder to said wheel cylinder;

an intake conduit;

a traction slip loading valve;

a self-priming pump having:

(a) an intake side connected to said pressure fluid reservoir through said intake conduit and said master cylinder, and connected to said low-pressure accumulator through (i) a brake slip conduit which is closed as long as the pressure fluid volume stored within said low-pressure accumulator is less than a predetermined standby volume, and (ii) a traction slip conduit which is opened and closed by said traction slip loading valve independently of the stored pressure fluid volume, and (b) a pressure side in communication with said brake conduit;

an inlet and outlet valve arrangement controlling the pressure within said wheel cylinder; and a second valve arrangement which, in a pedal-actuated braking operation, separates the intake side of said pump from said master cylinder and, during traction slip control, discontinues the connection between said master cylinder and said wheel cylinder.

* * * * *

UNITED STATES PATENT AND TRADEMARK OFFICE
CERTIFICATE OF CORRECTION

PATENT NO.    : 5,411,326
DATED         : May 2, 1995
INVENTOR(S)   : Linhoff

It is certified that error appears in the above-identified patent and that said Letters Patent is hereby corrected as shown below:

```
In column 5, claim 3, line 20, add the word --valve--
after "travel-controlled" and before "controlling"
```

Signed and Sealed this

Twenty-ninth Day of August, 1995

*Attest:*

BRUCE LEHMAN

*Attesting Officer*    Commissioner of Patents and Trademarks